Dec. 4, 1962 G. S. NALLE, JR 3,067,084
DIE HEAD FOR EXTRUDING PLASTIC NETTING
AND METHOD OF EXTRUDING SUCH NETTING
Filed Sept. 21, 1959 2 Sheets-Sheet 2

INVENTOR.
GEORGE S. NALLE, JR.

BY
Philip E. Siggers
ATTORNEY

3,067,084
DIE HEAD FOR EXTRUDING PLASTIC NETTING AND METHOD OF EXTRUDING SUCH NETTING
George S. Nalle, Jr., 108 W. 2nd St., Austin 1, Tex.
Filed Sept. 21, 1959, Ser. No. 841,064
4 Claims. (Cl. 156—167)

This invention relates to die heads for extruding plastic nettings.

The present application is a companion to my copending application Serial No. 837,732, filed September 2, 1959, entitled "Method and Apparatus for Extruding Netting, also the Products of that Method" (Case 2).

According to the present invention, a die head is provided having a stationary die plate surrounding a rotary die plate; both die plates have extrusion openings arranged in circular series; the pressurized plastic mixture is forced through the two series of extrusion openings to form groups of strands or filaments of indefinite length; and the rotating group of strands formed by the rotating die plate are caused to fuse or coalesce with the non-rotating group of strands formed by the stationary die plate. But whereas in said companion application Serial No. 837,732 the fusing or coalescing takes place just inside the die head, according to the present invention the fusing or coalescing is effected entirely outside of, though near, the die head, while the strands are still soft. This fusing or coalescing is accomplished by tension and travel of one group of strands relative to the other group of strands, so that one group crosses and contacts the other group and under such tension that the strands are united at the points of crossing. The two groups of strands after uniting travel as a unitary tubular netting over the periphery of a circular spreader or mandrel whose diameter is necessarily larger than the diameter of the extrusion circle (the imaginary circle lying between the two circular series of extrusion openings). This larger spreader is essential to the uniting of the groups of strands by the present method and apparatus. The spreader or mandrel is in a water bath which aids in hardening the plastic strands. Then the tubular netting may be wound up on reels or cut and packaged, or it may be cut longitudinally and laterally to form a netting of a single thickness and the desired dimensions. The product of the invention apparatus is visually about the same as the product of the method disclosed in said companion application, viz., a tubular netting or mesh cylinder of unified strands, but the points of juncture or crossings are not as completely integrated.

In the accompanying drawings forming a part of this specification—

Figure 2:
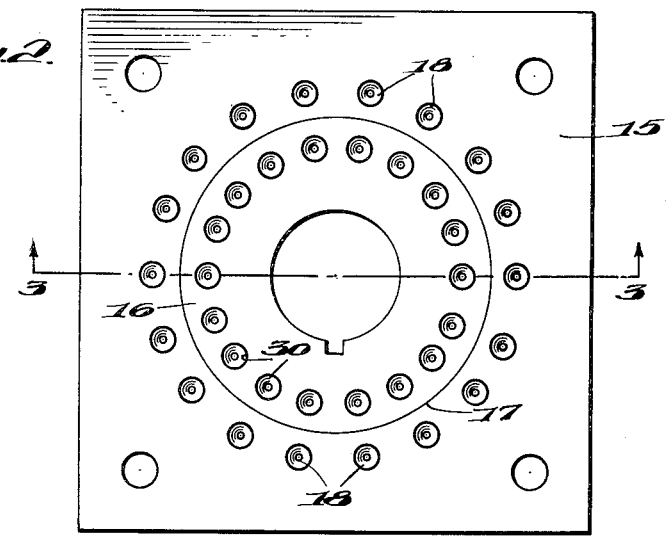
FIG. 2 is a top plan view of the die plate assembly, that is the rotary die plate assembled with the stationary die plate.

In said drawings, I have shown only so much of a die head as is necessary for an understanding of the invention. The extrusion screw, the source of resinous plastic, the heating system, and other conventional parts of a complete extrusion die head are all omitted. Referring particularly to the drawings, the die head 10 has a chamber or cavity 11 for the pressurized resinous plastic, which flows in through an inlet port 12 near the upper end of said chamber. Removably secured by studs 13 to the bottom of the die head is a die plate assembly shown per se in FIGS. 2, 3 and 4. This die plate assembly closes the lower end of chamber 11 and seals it except for the extrusion openings to be described.

Figure 3:
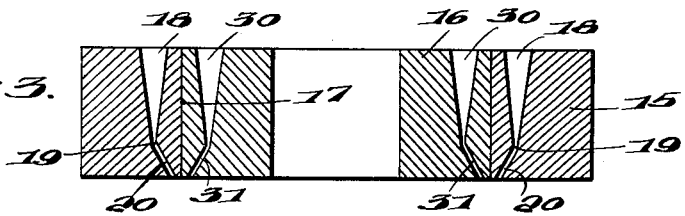
FIG. 3 is a cross section on line 3—3 of FIG. 2.
Figure 4:
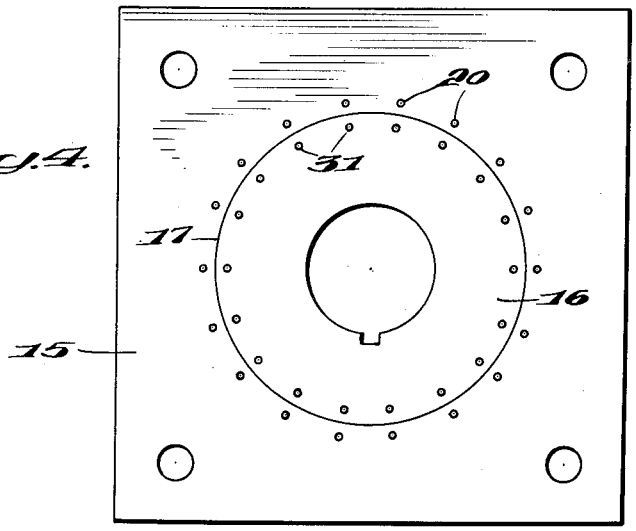
FIG. 4 is a bottom plan view of said die plate assembly, showing the extrusion or discharge side of the same.

The die plate assembly includes a stationary die plate 15 and a rotary die plate 16 rotatable in a circular finished opening 17 provided in die plate 15. Both die plates are of high grade steel, bronze or other metal alloys of superior resistance to wear, and both are of the same thickness. The stationary die plate 15 may be square, as illustrated, and has a circular series of extrusion openings 18 arranged at regular intervals about the opening 17 and extending from top to bottom (inside to outside) of said die plate. The extrusion passages 18 are conical for about two-thirds of their length with their large ends at the top providing inlets for the pressurized plastic. At a point about two-thirds of the thickness of die plate 15 the extrusion passages 18 are narrowest as indicated at 19; beyond these constricted throats 19 the passages 18 change direction and turn toward, but do not intersect, opening 17. The portions 20 of the extrusion openings beyond the constricted throats 19 are straight round holes, that is, are cylindrical, and their diameter is substantially greater than the width of throats 19 but substantially smaller than the inlet ends of the openings. The angles of these cylindrical bores 20 may be 45° instead of about 60° as illustrated in FIG. 3, the precise angle not being critical. The small discharge ends of extrusion openings 20 are spaced from opening 17, as shown in FIG. 4. This is important. These discharge ends may be as small as .010 in. in diameter, but usually are much larger. The inlet ends of the extrusion openings may be ¼ in. in diameter.

Journaled on the die head 10 is a shaft or spindle 21 which extends axially of chamber 11 and out through the upper wall of the die head. This spindle supports and turns the rotary die plate 16, as will be explained. A V-belt pulley 22 is secured by a set screw 23, or in other ways, to spindle 21, and a V-belt 24 driven by a motor and change speed gearing (not shown) turns the spindle and hence the rotary die plate at a speed which is selected by the operator to vary the pattern of the netting, as will be apparent presently. A thrust bearing 25, shown diagrammatically, supports the vertical spindle 21 against the outward thrust of the plastic during the extrusion process. A sleeve 26, with ventilation holes 27 to dissipate the heat conducted by the spindle (which is in direct contact with the heated plastic), is interposed between the hub of the pulley 22 and the thrust bearing 25. Nuts 28 screwed on the upper end of the spindle secure the pulley tightly against the sleeve 26.

The rotary die plate 16 is secured by a key 29 to the spindle to rotate therewith. Die plate 16 is circular, fits closely in opening 17 to prevent leakage of the pressurized plastic, and has a circular series of extrusion openings or passages 30 which are exactly like openings 18 in size and shape, except that the straight cylindrical portions 31 of said openings extend at an angle that is complemental to the angle of the passage portions 20; that is, if the portions 20 are at angles of 60°, the portions 31 are at angles of 120°, and if the angles of portions 20 are 45°, the other angles are 135°. The discharge ends of passages 31 are spaced the same distance from the periphery of the rotary die plate 16 as the discharge ends of passages 20 are spaced from the opening 17. Normally there will be as many openings 30 as there are openings 18. There may be as few as 12 or as many as several hundred extrusion openings in each group or set.

Loosely mounted on the lower end of the spindle is a spreader mandrel 35 having a smooth circular periphery of substantial area. This mandrel being loose does not necessarily rotate with the spindle. The general plane of the mandrel is at right angles to the axis of the spindle, which is also the "extrusion axis." The function of this mandrel is two-fold: first, it plays an essential part in uniting the strands or filaments extruded from openings 18, 30; second, it expands and stretches the tubular fabric F formed by the die head, the reason for this being that the diameter of the mandrel is considerably larger than the diameter of the "extrusion circle." This mandrel is normally immersed in a bath of water (not shown) to harden the plastic during and after stretching. For greater stretching, mandrels of larger diameter will be substituted for mandrel 35.

Figure 1:
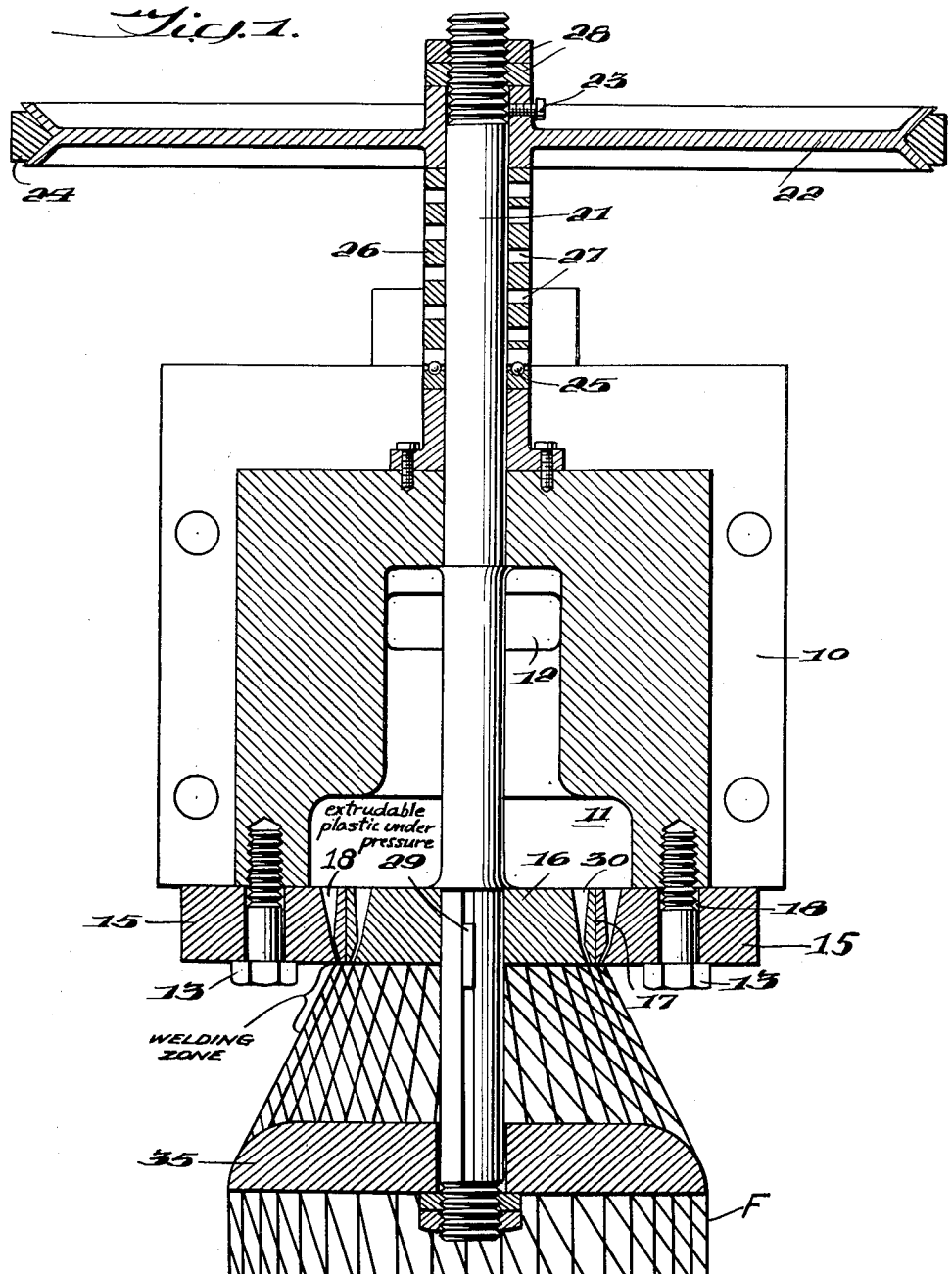
FIG. 1 is a vertical sectional elevation through part of my improved die head for extruding plastic netting, showing a tubular netting being extruded but omitting the supply of plastic inside the die head so as to reveal the construction.

The filaments or strands extruded from openings 18 move parallel to the axis of the spindle (the extrusion axis) forming a circular series or group of strands which does not rotate. But the strands extruded from openings 30 not only travel outwardly but also move in spiral paths which almost intersect the paths traversed by the first named strands. The fabric F is pulled over the periphery of the mandrel by any well known mechanism. The contact of the fabric with the loose mandrel causes it to rotate, or remain stationary, as determined by the resultant of forces acting on the mandrel periphery. This pull on the fabric and the outward or lateral movement of the strands brings the two sets or groups of strands together in a zone adjacent the "extrusion circle," indicated in FIG. 1. As the strands are then soft and warm they weld or fuse at the crossings to form the mesh fabric F. No extraneous pressing rolls or other mechanism is needed to make the welds. The method works very well with vinyl plastics and satisfactorily with polyethylene.

The present method has some advantages over the method disclosed in said companion application Ser. No. 837,732 (Case 2) in that the two sets of extrusion openings do not discharge in common outlets at the face of the die head; such common outlets tend to clog at one or more points, which ruins the appearance of the plastic fabric. The reason for this malfunctioning is not understood but it occurs fairly often. The unimpeded discharge from outlet tubes 20, 31 works better to clear the extrusion openings of the plastic. However, as previously indicated, the bringing together of the groups of strands outside the die head, as described and illustrated herein, effects a weld or fusing at the crossings which is less perfect than the coalescing which inevitably takes place when the groups of strands unite at the crossings before issuing from the die head.

The essential method described herein was disclosed in my pending application Serial No. 778,184 filed December 4, 1958 (Case 1).

Having described my invention, I claim:

1. A method of continuously forming a netting from an extrudable heated resinous plastic composition comprising extruding from a die head containing a supply of such plastic composition of group of filaments running generally parallel to each other and spaced equal distances from the axis of extrusion; simultaneously extruding from said die head another group of filaments running generally parallel to each other and spaced equal distances from the same axis; the filaments of the second named group being closer to said axis than the filaments of the first named group; rotating the second named group of filaments about said axis as they are formed; simultaneously pulling both groups of filaments longitudinally outwardly from the extrusion area and simultaneously moving both groups radially outwardly in such a way as to force the filaments of the two groups into fusing contact in mid-air while the filaments are still soft and warm, so as to cause each filament to be fused to all the filaments it crosses, thereby forming a continuous unitary tubular netting made entirely of a resinous plastic composition.

2. The method defined in claim 1, wherein the aforementioned fusing takes place in the area between the extrusion zone and a mandrel that is spaced from the die head, the pulling of the groups of filaments originating from a point beyond the mandrel and the contact of the pulled filaments with the mandrel, in conjunction with the dimensions of the mandrel and its position, effecting the aforesaid outward lateral movements of the filaments.

3. Extrusion apparatus comprising, in combination: a die body adapted to hold a supply of extrudable resinous plastic in a chamber provided in said die body; a stationary die plate fixed to said die body and partially closing the lower end of said chamber; said stationary die plate having a circular opening; a rotatable circular die plate supported for rotation inside said circular opening; said stationary die plate having a circular series of extrusion openings spaced all around said circular opening and each extending from the inner face to the outer face of said stationary die plate; each of said stationary die plate extrusion openings having its discharge end spaced radially outward from said circular opening; said circular die plate having a circular series of extrusion openings each extending from the inner face to the outer face of said circular die plate; each of said circular die plate extrusion openings having its discharge end spaced radially inward from said circular opening; power-driven means to move said die plates relative to each other through an arc at least equal to the arcuate spacing between adjacent extrusion openings of said die plates; and a mandrel supported and spaced from said die body and having a circular smooth periphery of substantially larger diameter than the diameter of both of said circular series of extrusion openings of said die plates; the general plane of said mandrel being substantially at right angles to the axis of said die plates; and said mandrel being positioned so as to force the filaments extruded from said two circular series of extrusion openings into fusing contact at a point adjacent said die plates remote from said chamber so that a mesh fabric is formed by a plurality of fused filaments.

4. An extrusion apparatus in accordance with claim 3, wherein both sets of extrusion openings are substantially conical for the greater part of their lengths, a constriction or narrow throat being at the smaller end of each conical portion, each opening being cylindrical beyond said narrow throat, the diameter of the cylindrical portions being greater than the width of said narrow throat but being smaller than the base diameter of the conical portions, the axes of said cylindrical portions being at an acute angle to the axis of extrusion, the cylindrical portions of the extrusion openings in said stationary die plate extending at angles that are complementary to the angles of the cylindrical portions of the extrusion openings in said rotatable die plate.

References Cited in the file of this patent

UNITED STATES PATENTS

| 2,740,986 | Lipscomb | Apr. 10, 1956 |
| 2,919,467 | Mercer | Jan. 5, 1960 |

FOREIGN PATENTS

| 17,549 | Great Britain | of 1898 |
| 153,610 | Australia | Oct. 13, 1953 |
| 521,092 | Canada | Jan. 24, 1956 |
| 552,251 | Belgium | Nov. 14, 1956 |